United States Patent [19]

Augustyn

[11] 4,274,987

[45] Jun. 23, 1981

[54] COUPLING AGENTS FOR THERMOPLASTIC COMPOSITES

[75] Inventor: Edward J. Augustyn, Yardville, N.J.

[73] Assignee: NL Industries, Inc., New York, N.Y.

[21] Appl. No.: 98,578

[22] Filed: Nov. 29, 1979

Related U.S. Application Data

[63] Continuation of Ser. No. 941,080, Sep. 11, 1978, abandoned.

[51] Int. Cl.$^3$ .................. C08J 3/10; C08J 3/20; C08J 3/22; C08K 9/04
[52] U.S. Cl. .................. 260/23 H; 260/23 AR; 260/23 XA; 260/23 S; 260/31.2 R; 260/31.6; 260/42.13; 260/42.14; 260/42.57
[58] Field of Search ............... 106/308 F; 260/23 H, 260/23 AR, 23 XA, 23 S, 31.2 R, 31.6, 42.13, 42.14, 42.57

[56] References Cited

U.S. PATENT DOCUMENTS

| | | | |
|---|---|---|---|
| 2,140,375 | 12/1938 | Allen et al. | 106/308 F |
| 3,951,849 | 4/1976 | Vickery et al. | 106/308 F |
| 4,015,999 | 4/1977 | Robertson et al. | 106/308 F |
| 4,126,593 | 11/1978 | Takahashi | 106/308 F |

OTHER PUBLICATIONS

Application Newsletter, subject: Flexricin ® Plasticizers for Polyvinyl Chloride Resins, Baker Castor Oil Company, Apr., 1955, Code File PVN, Reference TB#24, No. 19 (pp. 1–5).

*Primary Examiner*—Ronald W. Griffin
*Attorney, Agent, or Firm*—Gary M. Nath

[57] ABSTRACT

Filled thermoplastic resin composites are provided containing a novel coupling agent selected from the group consisting of mono-, di- and tri-long chain fatty acid esters of $C_1$ to $C_{36}$ mono and polyhydric alcohols.

The coupling agents are particularly effective bonding agents for calcium carbonate filled thermoplastic resins for which previously used coupling agents, such as organosilanes, proved ineffective.

16 Claims, No Drawings

COUPLING AGENTS FOR THERMOPLASTIC COMPOSITES

This is a continuation, of application Ser. No. 941,080, filed Sept. 11, 1978, now abandoned.

This invention is concerned with coupling agents for filled plastics particularly calcium carbonate filled plastics.

In view of the recent shortages of petroleum feed stocks necessary to manufacture such polymers as polyethylene, PVC, polypropylene and other polyolefins and the expectancy that these shortages will continue, there has arisen a need to incorporate larger volumes of inexpensive filler products into these polymers. These fillers function as extenders and reinforcing aids to improve the mechanical properties of the polymer in which they are incorporated such as tensile impact strength, ductility and Gardner impact strength. It is expected that the volume of thermoplastic polymers requiring fillers will continue to grow at increasing rates each year.

Coupling agents or adhesion promoters are often used in filled plastic composites to aid in the incorporation of filler into the polymer and to form an adhesive bond between filler and polymer. These coupling agents become more essential as higher loadings of filler are incorporated into the plastics. By virtue of such coupling agents, useful thermoplastic composites containing about 70% filler can be processed using conventional extrusion and injection molding equipment.

Heretofore, organo-silanes have been the most widely used coupling agents for filled plastic composites. These organo-silane coupling agents have demonstrated a high degree of success in bonding numerous polymer resins filled with silica, metal silicates or metal oxides. They have not been as effective, however, in other systems, such as with calcium carbonate fillers which are used extensively in many resins. Organo-titanates function to some degree as bonding agents for calcium carbonate filled polymers and are therefor useful as coupling agents.

The present invention, on the other hand, provides non-titanate, non-silane coupling agents which bond thermoplastic polymers to a variety of inorganic mineral fillers. Thermoplastic resin filler composites containing these agents exhibit improvements in physical properties, processability and thermal stability. The agents of this invention perform as well or better than the organo-titanates as coupling agents for calcium carbonate filled polymers but are distinctly superior to the titanates in terms of cost.

The coupling agents of this invention comprise mono-, di-, and tri-, long chain fatty acid esters of $C_1$ to $C_{36}$ mono and polyhydric alcohols and preferably $C_1$ to $C_4$ mono and polyhydric alcohols. Preferably, coupling agents from this class will be selected from the group consisting of the mono-, di-, and tri-esters of hydroxy fatty acids or acetyl derivatives thereof.

The present coupling agents are prepared by esterifying the fatty acids with $C_1$ to $C_{36}$ alcohols and polyols such as methanol, propanol, butanol, ethylene glycol, propylene glycol, pentaerythritol, glycerol, decanol, dodecanol, tetradecanol, pentadecanol, hexadecanol, octadecanol, eicosanol, docosanol and tetratriacontanol as well known in the art to form mono-, di- and tri-esters of fatty acids.

Typical long chain hydroxy fatty acid esters or acetyl derivatives thereof of this invention are methyl ricinoleate, methyl acetyl ricinoleate, ethyl acetyl ricinoleate, ethyl ricinoleate, butyl ricinoleate, butyl acetyl ricinoleate, glyceryl tri (ricinoleate), glyceryl tri (acetyl ricinoleate) methyl hydroxy stearate, methyl acetyl stearate, ethyl hydroxy stearate, ethyl acetyl stearate, butyl hydroxy stearate, butyl acetyl stearate, glyceryl tri hydroxy (stearate), and glyceryl tri (acetyl stearate).

The hydroxy fatty acids or acetyl derivatives thereof may have saturated or unsaturated fatty acid chains and contain 8 to 22 carbon atoms, and preferably 18 carbon atoms. Exemplary compounds are hydroxy stearic acid and ricinoleic acid (i.e. hydroxy oleic acid) and acetyl derivatives thereof.

The coupling agents of this invention may be represented by the formula:

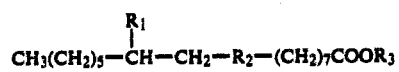

Formula I:

wherein $R_1$ is a hydroxyl group or acetyl group; $R_2$ is —CH=CH—, or —$CH_2$—$CH_2$—; $R_3$ is a mono, di- or tri-ester group containing from 1 to 36 carbon atoms.

A preferred compound is an ester of acetyl ricinoleic acid, i.e. 12-acetyl-9-octadecenoic acid, represented by the formula wherein $R_3$ represents the ester group:

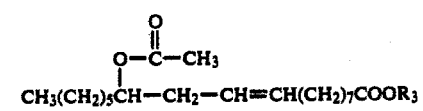

Formula II:

Another preferred compound is an ester of acetyl stearic acid, i.e. 12-acetyl-9-octadecanoic acid, represented by the formula wherein $R_3$ represents the ester group:

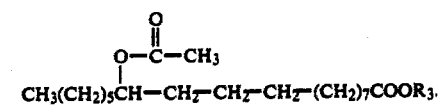

Formula III:

The preferred hydroxy fatty acid esters and acetyl derivatives thereof of this invention are lower alkyl mono ricinoleates and hydroxy stearates wherein the alkyl group contains from 1 to 36 carbon atoms. While all of the compounds of this invention act as excellent bonding agents between the resin and inorganic filler, the methyl acetyl ricinoleate imparts superior reinforcing properties, such as tensile impact strength and ductility to the filled resin composites in which it is incorporated.

The amount of hydroxy fatty acid ester or acetyl derivative thereof incorporated in the filled thermoplastic composite can vary over wide ranges. It should however be employed in amounts of about 0.5 to about 7.5% by weight of the filler component, and preferably about 0.5 to about 5% by weight of the filler component.

It has been found that by virtue of the present coupling agents, up to 80% by weight, preferably 5% to 75% and most preferably 10% to 70% of inorganic filler can be incorporated into the resin to form a composite based on the weight of total composite.

As previously mentioned, the coupling agents of this invention can be used with a variety of inorganic mineral fillers including silicas, metal silicates, metal oxides, hydrated aluminum oxides and antimony trioxide, the latter of which are used as flame-retardant additives for polyolefins and combinations thereof. The thermoplastic resins in which the coupling agents of this invention may be used to bond fillers thereto include the polymeric amides, such as nylon and products of polymerization of organic monomers containing one or more unsaturated double bonds such as ethylene, propylene, styrene, acrylobutadiene styrene, methacrylic acid, vinyl acetate, vinyl chloride and mixtures thereof.

The coupling agents of this invention are particularly useful in calcium carbonate filled thermoplastic resin composites such as calcium carbonate filled high density polyethylene resins, homopolymer polypropylene resins and polyvinyl chloride resins. The calcium carbonate fillers can be either coated or uncoated and can vary in particle size distribution from 0.06 to 6.0 microns. Moreover, resin filler composites containing the inventive coupling agents can be processed at temperatures of about 335° F. without change in color which indicates a heat stabilizing effect on the composite.

The long chain fatty acid esters and acetyl derivatives thereof of this invention can be incorporated with the resin and filler by a variety of conventional methods. For example, the resin may first be fluxed on a 2 roll calender at temperatures sufficient to fuse the resin. Next, the coupler may be blended by mixing with the resin followed by blending the filler in the resin-coupler mix. In another method, the filler and coupling agent may be blended in a high speed mixer to coat the coupling agent on the filler. The coated filler is then milled with the resin on a 2 roll calender. In still another method, the coupling agent is first dissolved in toluene followed by slurrying the solution with filler to again coat the filler. The slurry is then dried and fluxed with the resin on a 2 roll calender. The so-formed composite may be compounded and processed by conventional techniques to fabricate a large variety of self-supporting or laminar plastic forms.

The bonding action of the hydroxy fatty acid esters or acetyl derivatives thereof permits the plastics manufacturer to incorporate increasingly higher levels of low cost inorganic mineral fillers without sacrificing certain highly desirable properties such as impact strength, melt flow and thermal stability. The fatty acid esters of this invention permit bonding of fillers other than the silicas, metal silicates and metal oxides, particularly calcium carbonate. Calcium carbonate and other non-silicate, non-oxide minerals have until now, resisted being bonded to organic polymers by means of conventional coupling agents such as the organo-silanes.

The thermoplastic composite may be compounded and processed by conventional techniques such as injection molding, and extrusion. Injection molded calcium carbonate filled composites prepared using couplers of this invention give improved reinforcement and melt flow properties relative to commercial injection molded resin composites filled with a metal silicate such as talc.

The following examples are given to illustrate the invention, but are not deemed to be limiting thereof. All percentages given are based upon weight unless otherwise indicated.

EXAMPLES 1 TO 6

These examples illustrate the effect of the alkyl acetyl ricinoleate coupling agents of this invention in improving the reinforcing characteristics of high density polyethylene (HDPE) filled with 30% by weight of an uncoated calcium carbonate product having a mean particle size distribution of 2.5 microns. The coupling agents used were methyl acetyl ricinoleate, butyl acetyl ricinoleate, glyceryl tri (acetyl ricinoleate) and glyceryl tri (acetoxystearate).

A 3% coating of each coupling agent, based on the filler weight was accomplished by premixing 1.8 g. of coupler with 60 g. of calcium carbonate in a Ronson blender for 1 minute at 250° F. The resulting coated calcium carbonate powders were processed with 140 g. of HDPE for 8 minutes using a 2-roll calender set at 275° F. The so-formed stocks were removed and compression molded for 5 minutes at 325° F. to form 40 mil. slabs which were then tested for tensile impact strength using a Plastics Impact Tester (model TM 52004, Testing Machines, Inc.). The results obtained comprised an average of six test specimens on each example; 3 cut in a direction parallel to milling and 3 cut at 90° to the direction of milling.

As controls, a HDPE sample containing no filler and coupler, and a sample containing calcium carbonate filler and no coupler were tested. A sample containing calcium carbonate filler and an organo titanate coupler, isopropyl triisostearic titanate was also tested. The results are given in Table 1 below:

TABLE 1

| EXAMPLE | FILLER | COUPLING AGENT | TENSILE IMPACT STR. (ft-lbs/in$^2$) | DUCTILITY (milliseconds) |
|---|---|---|---|---|
| 1 | None | None | 144 | 2.1 |
| 2 | CaCO$_3$ | None | 74 | 0.9 |
| 3 | CaCO$_3$ | Methyl acetyl ricinoleate | 139 | 2.5 |
| 4 | CaCO$_3$ | Butyl acetyl ricinoleate | 92 | 1.3 |
| 5A | CaCO$_3$ | Glyceryl tri(acetyl ricinoleate) | 118 | 1.9 |
| 5B | CaCO$_3$ | Glyceryl tri(acetoxystearate) | 103 | 1.7 |
| 6 | CaCO$_3$ | Isopropyl triisostearic titanate | 118 | 2.1 |

As Table 1 shows, a significant improvement in the reinforcing properties of calcium carbonate occurred when coated with alkyl acetyl ricinoleates of this invention (compare Ex. 2 with Examples 3, 4 and 5). The methyl acetyl ricinoleate, glyceryl tri (acetyl ricinoleate) and glyceryl tri (acetoxystearate) coated calcium carbonate performed as good or better than the organo titanate.

EXAMPLES 7 TO 17

These examples illustrate that various conventional compounding techniques can be used to incorporate the alkyl acetyl ricinoleates of this invention in a thermoplastic polymeric material to yield a composite having excellent reinforcement properties.

In each example a filled composite containing 30% calcium carbonate and 70% HDPE was prepared. Example 8, containing only 30% calcium carbonate without coupler was used as a control.

Two alkyl acetyl ricinoleates of this invention, methylacetyl ricinoleate and butyl acetyl ricinoleate were incorporated in the composite by different conventional methods and the resulting milled stocks were compression molded for 5 minutes at 325° F. to form 0.040 inch plaques. Specimens were cut from each plaque and used for tensile impact strength and ductility tests. An organo titanate coupler, isopropyl triisostearic titanate, was also incorporated into the composition for each method employed and tested.

In the first series of examples (8-11) the HDPE was fluxed on a 2 roll calender at 275° F. and after fusion took place (2 min.), the coupling agents were added and mixed for 3 minutes. The calcium carbonate filler was slowly added to the HDPE-coupling agent mixture and the resulting composite mixed for a total of 10 minutes. A composite containing no coupler was prepared as a control (Ex. 8).

In Examples 12-14 the calcium carbonate was first combined with the coupling agents in a high speed blender. The so-formed coated fillers were incorporated into the HDPE on a 2 roll calender and milled for 10 minutes.

In Examples 15-17 the coupling agents were first dissolved in toluene and this solution was slurried with calcium carbonate to form a 3% coating over the calcium carbonate. The slurry was dried at 120° C. for 45 minutes and the coated calcium carbonate fluxed with the HDPE for 10 minutes at 275° F. on a 2 roll calender.

Table 2 below summarizes the results:

As Table 2 shows, irrespective of the method of coating the filler and incorporating the coated filler in the resin, excellent reinforcing properties of the HDPE-filler composite result. Moreover, methyl acetyl ricinoleate—coated fillers inparted more improved reinforcing properties to the composite than the organo titanate coated fillers, except for the method used in Examples 8-11 in which the ricinoleate was comparable to the titanate.

EXAMPLES 18 TO 30

These examples illustrate the effect on the reinforcement properties of a high density polyethylene resin containing calcium carbonate filler coated with various amounts of methyl acetyl ricinoleate.

TABLE 2

| EX | FILLER | METHOD OF INCORPORATION | COUPLER (3% OF FILLER WT) | TENSILE IMPACT STR. (ft-lbs/in$^2$) | DUCTILITY |
|---|---|---|---|---|---|
| 7 | None | | None | 141 | 1.8 |
| 8 | CaCO$_3$ | Components Hand Blended | None | 62 | 0.7 |
| 9 | CaCO$_3$ | On 2 Roll Calender | Isopropyl Triisostearic Titanate | 140 | 1.8 |
| 10 | CaCO$_3$ | | Methyl acetyl Ricinoleate | 133 | 1.8 |
| 11 | CaCO$_3$ | | Butyl Acetyl Ricinoleate | 111 | 1.7 |
| 12 | CaCO$_3$ | | Isopropyl Triisostearic Titanate | 112 | 1.7 |
| 13 | CaCO$_3$ | Calcium Carbonate Preheated in Blender | Methyl Acetyl Ricinoleate | 121 | 1.7 |
| 14 | CaCO$_3$ | | Butyl Acetyl Ricinoleate | 110 | 1.7 |
| 15 | CaCO$_3$ | | Isopropyl Triisostearic Titanate | 127 | 2.0 |
| 16 | CaCO$_3$ | Couplers Deposited on Calcium Carbonate Via Toluene | Methyl Acetyl Ricinoleate | 132 | 2.2 |
| 17 | CaCO$_3$ | | Butyl Acetyl Ricinoleate | 94 | 1.4 |

In these examples, methyl acetyl ricinoleate was blended with calcium carbonate having an average particle size of 2.5 microns in a high speed blender to form calcium carbonate coated with from about 0.5 to 7.5% by weight of ricinoleate. The coated filler was incorporated with HDPE using a 2 roll calender to form a 30% calcium carbonate composite. The composites were fluxed for 10 minutes at 275° F., sheeted off and compression molded to form 0.040 inch plaques which were tested for tensile impact strength and ductility. A HDPE sample containing no filler (Ex. 18) and a HDPE sample containing 30% uncoated calcium carbonate (Ex. 19) were also tested as controls.

The results are given in Table 3 below:

As the table shows, improvement in tensile impact strength and ductility over the uncoated filler occurred at about 1.0% methyl acetyl ricinoleate. Optimum reinforcement occurred in composites formulated with calcium carbonate which had a 3.5-4.0% coating of methyl acetyl ricinoleate. After about 4.0% coating levels, reinforcing properties of the composite were gradually reduced but still better than with uncoated filler.

EXAMPLES 31 TO 40

These examples illustrate the improvement of reinforcing properties of an HDPE composite containing coated or uncoated calcium carbonate, by treating the calcium carbonate with an alkyl acetyl ricinoleate of this invention, methyl acetyl ricinoleate.

A variety of commercial coated and uncoated calcium carbonate products having a mean particle size distribution ranging from 0.06 microns to 6.0 microns were treated with methyl acetyl ricinoleate using a high speed blender. The treated products were fluxed with HDPE for 10 minutes at 275° F. on a 2 roll calender to form a composite containing 70% HDPE and 30% filler. For comparison, a series of coated and uncoated calcium carbonate fillers were fluxed with HDPE without prior treatment with a coupler. All stocks were compression molded 5 minutes at 325° F. into 0.040 inch plaques and tested for tensile impact properties.

bonate products were subsequently added and the total composite mixed an additional 8 minutes. The resulting stocks were compression molded for 5 minutes at 350° F. to form 0.040 in. plaques which were then used to determine tensile impact strength, ductility and Gardner impact strength at 75° F.

TABLE 3

| EXAMPLE | FILLER | METHYL ACETYL RICINOLEATE (wt. % of filler wt.) | TENSILE IMPACT STR (ft-lbs/in²) | DUCTILITY (milliseconds) |
|---|---|---|---|---|
| 18 | None | 0 | 123 | 1.7 |
| 19 | CaCO₃ | 0 | 73 | 0.7 |
| 20 | CaCO₃ | 0.5 | 70 | 0.7 |
| 21 | CaCO₃ | 1.0 | 83 | 0.9 |
| 22 | CaCO₃ | 2.0 | 104 | 1.1 |
| 23 | CaCO₃ | 2.5 | 117 | 1.5 |
| 24 | CaCO₃ | 3.0 | 116 | 1.7 |
| 25 | CaCO₃ | 3.5 | 129 | 1.7 |
| 26 | CaCO₃ | 4.0 | 125 | 1.9 |
| 27 | CaCO₃ | 4.5 | 111 | 1.6 |
| 28 | CaCO₃ | 5.0 | 108 | 2.1 |
| 29 | CaCO₃ | 6.0 | 107 | 1.0 |
| 30 | CaCO₃ | 7.5 | 88 | 1.2 |

TABLE 4

| EXAMPLE | CaCO₃ MEAN PARTICLE SIZE, (microns) | TENSILE IMPACT STRENGTH, (ft-lbs/in²) | |
|---|---|---|---|
| | | NO COUPLER | 3% METHYL ACETYL RICINOLEATE |
| 31 | No Filler | 123 | 130 |
| | UNCOATED CaCO₃ | | |
| 32 | 6.0 | 62 | 67 |
| 33 | 2.5 | 64 | 107 |
| 34 | 2.5 | 81 | 114 |
| 35 | 0.7 | 61 | 96 |
| 36 | 0.06 | 49 | 64 |
| | COATED CaCO₃ | | |
| 37 | 2.5 | 77 | 93 |
| 38 | 2.5 | 100 | 105 |
| 39 | 0.5 | 100 | 140 |
| 40 | 0.06 | 44 | 53 |

TABLE 5

| EXAMPLE | CaCO₃ % | METHYL ACETYL RICINOLEATE % (based on filler wt.) | TENSILE IMPACT TEST | | GARDNER IMPACT TEST* (ft-lbs) |
|---|---|---|---|---|---|
| | | | IMPACT STR. (ft-lbs/in²) | DUCTILITY (millisecs.) | |
| | | | UNCOATED CaCO₃ (2.8 microns) | | |
| 41 | 0 | 0 | 129 | 1.3 | 2.4 |
| 42 | 30 | 0 | 83 | 1.0 | 3.0 |
| 43 | 30 | 3 | 144 | 1.3 | 3.3 |
| 44 | 50 | 0 | 68 | 0.8 | 1.5 |
| 45 | 50 | 3 | 125 | 1.8 | 2.5 |
| 46 | 70 | 0 | 34 | 0.1 | 0.1 |
| 47 | 70 | 3 | 73 | 0.8 | 1.1 |
| | | | COATED CaCO₃ (0.5 microns) | | |
| 48 | 0 | 0 | 129 | 1.3 | 2.4 |
| 49 | 30 | 0 | 144 | 2.0 | 3.5 |
| 50 | 30 | 3 | 168 | 2.6 | 4.7 |
| 51 | 50 | 0 | 115 | 1.6 | 2.4 |
| 52 | 50 | 3 | 135 | 2.2 | 3.6 |
| 53 | 70 | 0 | 50 | 0.6 | 0.8 |
| 54 | 70 | 3 | 85 | 1.3 | 1.3 |

*employed a 4 lb. falling weight which was gradually raised to varying heights until rupture of the test specimens occurred.

A HDPE sample containing no filler and coupler were tested as a control.

The results are given in Table 4 below:

As Table 4 shows, in each case, whether the calcium carbonate filler was coated or uncoated, significant improvement in the reinforcing properties of the HDPE composite was achieved using treatments of methyl acetyl ricinoleate.

EXAMPLES 41 TO 54

These examples show that an alkyl acetyl ricinoleate of this invention methyl acetyl ricinoleate, can be used to improve the reinforcement properties of polypropylene homopolymer (PP)/calcium carbonate composite.

Methyl acetyl ricinoleate was used to provide a 3% coating over a series of uncoated calcium carbonate products or an additional 3% coating over coated calcium carbonate products using a high speed blender. For comparisons, the uncoated and coated calcium carbonate products alone were also employed for incorporation with PP.

Composites of PP and 30%, 50% and 70% calcium carbonate were prepared by first fluxing the PP for 2 minutes on a roll calender at 335° F. The calcium car- The results are given in Table 5 below:

As Table 5 shows, at each level of calcium carbonate in the composite, whether or not such carbonate filler was coated or uncoated, improved tensile impact strength, ductility, and Gardner impact strength resulted when the fillers were treated with methyl acetyl ricinoleate according to this invention.

EXAMPLES 55 to 58

These examples illustrate that methyl acetyl ricinoleate also acts as a stabilizer additive for thermoplastic resins to prevent discoloration of the filled resin during thermal processing.

In these examples, PP resin composites were prepared with 30% calcium carbonate alone, 30% methyl acetyl ricinoleate-coated calcium carbonate and 30% isopropyl triisostearic titanate-coated calcium carbonate. As a control, a PP resin containing no filler or coupling agent was also tested. All samples were heated to 335° F. for 10 minutes and the color observed. Table 6 below summarizes the results:

TABLE 6

| EXAMPLE | CaCO₃ (2.8 microns) % | COUPLER TYPE | COMPOSITE COLOR 10 mins. @ 335° F. |
|---|---|---|---|
| 55 | none | None | Clear |
| 56 | 30 | None | Off-White |
| 57 | 30 | Methyl Acetyl Rincinoleate | Off-White |
| 58 | 30 | Isopropyl Triisostearyl Titanate | Tan-Orange |

As Table 6 shows the resin composite containing methyl acetyl ricinoleate coated calcium carbonate did not undergo any color change relative to the resin composite containing no coupling agent.

EXAMPLES 59 to 71

These examples illustrate that calcium carbonate treated with 3% methyl acetyl ricinoleate (MAR) can be compounded at up to 50% loading with homopolymer (PP) resin, and the resulting composite injection molded using conventional molding techniques.

A series of PP resin composite containing 30% and 50% uncoated and coated calcium carbonate were prepared. Similarly another series of PP resin composites were prepared containing the above amounts of coated and uncoated calcium carbonate treated with 3% of MAR. PP resin containing no filler or coupler was selected as a control.

For each example, the tensile impact at 75° F. and Gardner impact (75° F. and 0° F.) were determined; melt flow characteristics were determined using procedures outlined in ASTM D-1238, "Measuring Flow Rate of Thermoplastics by Extrusion Plastometer" with a pressure mass of 2160 grams at 246° C.

Comparisons were also made against commercial injection molded PP resins containing talc as mineral filler and also against a high impact unfilled compolymer PP resin.

Table 7 summarizes the results:

EXAMPLES 72 to 74

These examples illustrate the improvement of reinforcing properties of polypropylene resins filled with antimony trioxide wherein the antimony trioxide is treated with methyl acetyl ricinoleate as a coupling agent.

Antimony trioxide functions as both a flame retardant and a filler because of the relatively large amounts often required to flame retard polypropylene compositions. Such antimony oxide often results in a loss in physical properties of polyolefin composites.

In these examples, antimony oxide having a mean particle size distribution of about 1.5 microns was coated with 3% of methyl acetyl ricinoleate based on the antimony trioxide weight. The MAR treated antimony tiroxide was compounded with PP to provide a 16.7% loading on a 2 roll calender, compression molded and tested for tensile impact strength.

As controls, a PP resin containing no antimony trioxide and coupler and a PP resin/Sb₂O₃ composite containing 16.7% Sb₂O₃ alone was also tested. The results are given in Table 8 below:

TABLE 8

| EX. | Sb₂O₃ % | MAR % (based on Sb₂O₃wt) | TENSILE IMPACT STR. (ft-lbs/in²) | DUCTILITY (millisecs) |
|---|---|---|---|---|
| 72 | 0 | 0 | 133 | 1.2 |
| 73 | 16.7 | 0 | 90 | 0.9 |
| 74 | 16.7 | 3 | 121 | 1.5 |

As Table 8 shows, MAR treated antimony trioxide/PP composite gave significant improvements on tensile impact strength and ductility over untreated antimony trioxide composite.

EXAMPLES 75 to 77

These examples illustrate the improvement in reinforcing properties of polypropylene resin filled with aluminum trihydrate (ATH) wherein the ATH is treated with methyl acetyl ricinoleate as a coupling agent.

Aluminum trihydrate is useful as both a flame/smoke retardant and filler in many thermoplastic applications.

TABLE 7

| EX | CaCO₃ % | MAR % | TENSILE IMPACT STRENGTH (ft-lbs/in) | DUCTILITY (millisecs) | GARDNER IMPACT (FT-LBS) 75° | GARDNER IMPACT (FT-LBS) 0 F. | FLOW RATE 246 C-2160 (gms/10 mins) |
|---|---|---|---|---|---|---|---|
| UNCOATED CaCO₃ (2.8 microns) | | | | | | | |
| 59 | 0 | 0 | 191 | 1.7 | 0.3 | 0.2 | 1.1 |
| 60 | 30 | 0 | 146 | 1.7 | 3.9 | 1.4 | 0.2 |
| 61 | 30 | 3 | 146 | 1.9 | 6.3 | 2.1 | 1.0 |
| 62 | 50 | 0 | 123 | 1.9 | 6.5 | 1.5 | 0.4 |
| 63 | 50 | 3 | 149 | 2.4 | 6.7 | 2.8 | 0.8 |
| COATED CaCO₃ (0.5 microns) | | | | | | | |
| 64 | 0 | 0 | 191 | 1.7 | 0.3 | 0.2 | 1.1 |
| 65 | 30 | 0 | 181 | 2.5 | 7.2 | 2.2 | 0.8 |
| 66 | 30 | 3 | 182 | 2.3 | 8.9 | 2.8 | 1.0 |
| 67 | 50 | 0 | 150 | 2.4 | 7.8 | 4.1 | 1.2 |
| 68 | 50 | 3 | 162 | 2.7 | 8.1 | 5.8 | 1.4 |
| COMMERCIAL INJECTION MOLDING PP COMPOSITES | | | | | | | |
| 69 Copolymer PP | | | 216 | 2.8 | 7.8 | 4.0 | 0.8 |
| 70 PP/Talc(60/40) | | | 65 | 0.5 | 0.3 | 0.2 | 0.5 |
| 71 PP/Talc(80/20) | | | 97 | 1.2 | 3.2 | 0.8 | 0.3 |

As the Table shows, the treatment of CaCO₃ with methyl acetyl ricinoleate produces injection molded PP/CaCO₃ composites with improved reinforcement and melt flow properties over untreated PP/CaCO₃ composites and over commercial injection molded PP composite.

In these examples, ATH having a mean particle size of about 1 micron was coated with 3% of methyl acetyl ricinoleate based on the ATH weight. The MAR treated ATH was compounded with PP to form a 25% loading using a 2-roll calender, compression molded and examined for tensile impact strength.

As controls, a PP resin without ATH and coupler and a PP resin/ATH composites containing 25% ATH alone was also tested. The results are given in Table 9.

TABLE 9

| EX. | ATH % | MAR % (based on ATH wt.) | TENSILE IMPACT STR. (ft-lbs/in$^2$) |
|---|---|---|---|
| 75 | 6 | 0 | 106 |
| 76 | 25 | 0 | 35 |
| 77 | 25 | 3 | 80 |

Table 9 shows that MAR treated PP/ATH composites develop significant improvements in tensile impact strength over the untreated ATH composites.

EXAMPLES 78 to 81

These examples illustrate the improvement in reinforcing properties of polypropylene filled with the amounts of calcium carbonate (uncoated or coated) having a mean particle size distribution of 2.5 microns according to the procedure of Examples 1 to 6. The coupling agents used were docosylhydroxystearate wherein the alcohol is a by-product mixture containing $C_{20}$-$C_{28}$ linear primary alcohols containing about 60% $C_{22}$; and tetratriacontyl ricinoleate wherein the alcohol is a by-product mixture containing 65% $C_{34}$ saturated primary alcohol and remainder being non-reactive material being 500 molecular weight normal paraffin.

As Table 10 shows, a significant improvement in reinforcing properties of calcium carbonate occurred when coated with the compositions of this invention.

The invention being thus described, it will be obvious that the same may be varied in many ways, such variations are not to be regarded as a departure from the spirit and scope of the invention, and all such modifications are intended to be included within the scope of the following claims.

TABLE 10

| EX | FILLER | COUPLING AGENT | TENSILE IMPACT STR (ft-lbs/in$^2$) | DUCTILITY milliseconds |
|---|---|---|---|---|
| 78 | NONE | NONE | 116 | 0.8 |
| 79 | CaCO$_3$ | NONE | 77 | 0.7 |
| 80 | CaCO$_3$ | C$_{22}$ plus ester of hydroxy-stearic acid | 108 | 1.0 |
| 81 | CaCO$_3$ | C$_{36}$ ester of recinoleic acid | 85 | 0.7 |

What is claimed is:

1. A composition comprising a thermoplastic resin containing a particulate inorganic mineral filler and a coupling agent, said coupling agent selected from the group consisting of mono-, di- and tri-long chain fatty acid esters of $C_1$ to $C_{36}$ mono and polyhydric alcohols, wherein said long chain fatty acid comprises hydroxy fatty acids or acetyl derivatives thereof, and wherein said coupling agent comprises from about 0.5 to 7.5% by weight of said filler.

2. The composition of claim 1 wherein said long chain fatty acid comprises acetyl ricinoleic acid.

3. The composition of claim 1 wherein said long chain fatty acid comprises acetyl stearic acid.

4. The composition of claim 1 wherein said long chain fatty acid comprises ricinoleic acid.

5. The composition of claim 1 wherein said long chain fatty acid comprises hydroxystearic acid.

6. The composition of claim 1 wherein said thermoplastic resin is the product of the polymerization of organic monomers containing one or more unsaturated double bonds.

7. The composition of claim 6 wherein said thermoplastic resin is selected from the group consisting of polymerized monomers of ethylene, propylene, styrene, acrylobutadiene styrene, methacrylic acid, vinyl acetate, vinyl chloride and mixtures thereof.

8. The composition of claim 1 wherein said inorganic mineral filler is selected from the group consisting of silicas, metal silicates, metal oxides, hydrated aluminum oxides, antimony trioxide, calcium carbonate and combinations thereof.

9. The composition of claim 8 wherein said metal oxide is antimony trioxide.

10. The composition of claim 1 wherein the particulate mineral filler is coated with the coupling agent.

11. A composition comprising a thermoplastic resin containing calcium carbonate filler and a coupling agent, said coupling agent represented by the formula

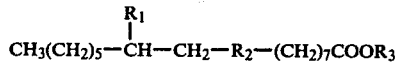

wherein $R_1$ is a hydroxyl group or acetyl group; $R_2$ is $-CH=CH-$, or $-CH_2-CH_2-$; $R_3$ is a mono-, di- or tri- ester group containing 1 to 36 carbon atoms, and wherein said coupling agent comprises from about 0.5 to 5.0% by weight of said filler and said filler is coated with the coupling agent.

12. The composition of claim 11 wherein said thermoplastic resin is selected from the group consisting of polymerized monomers of ethylene, propylene, styrene, acrylobutadiene styrene, vinyl chloride, methacrylic acid, vinyl acetate and mixtures thereof.

13. The composition of claim 11 wherein said thermoplastic resin is a high density polyethylene resin.

14. The composition of claim 11 wherein said thermoplastic resin is a polypropylene resin.

15. The composition of claim 11 wherein said coupling agent is selected from the group consisting of methyl ricinoleate, methyl acetyl ricinoleate, ethyl ricinoleate, ethyl acetyl ricinoleate, butyl ricinoleate, butyl acetyl ricinoleate, glyceryl ricinoleate, glyceryl tri (acetyl ricinoleate).

16. The composition of claim 11 wherein said coupling agent is selected from the group consisting of methyl hydroxy stearate, methyl acetyl stearate, ethyl hydroxy stearate, ethyl acetyl stearate, butyl hydroxy stearate, butyl acetyl stearate, glyceryl tri (stearate) and glyceryl tri (acetyl stearate).

* * * * *